Patented Aug. 18, 1936

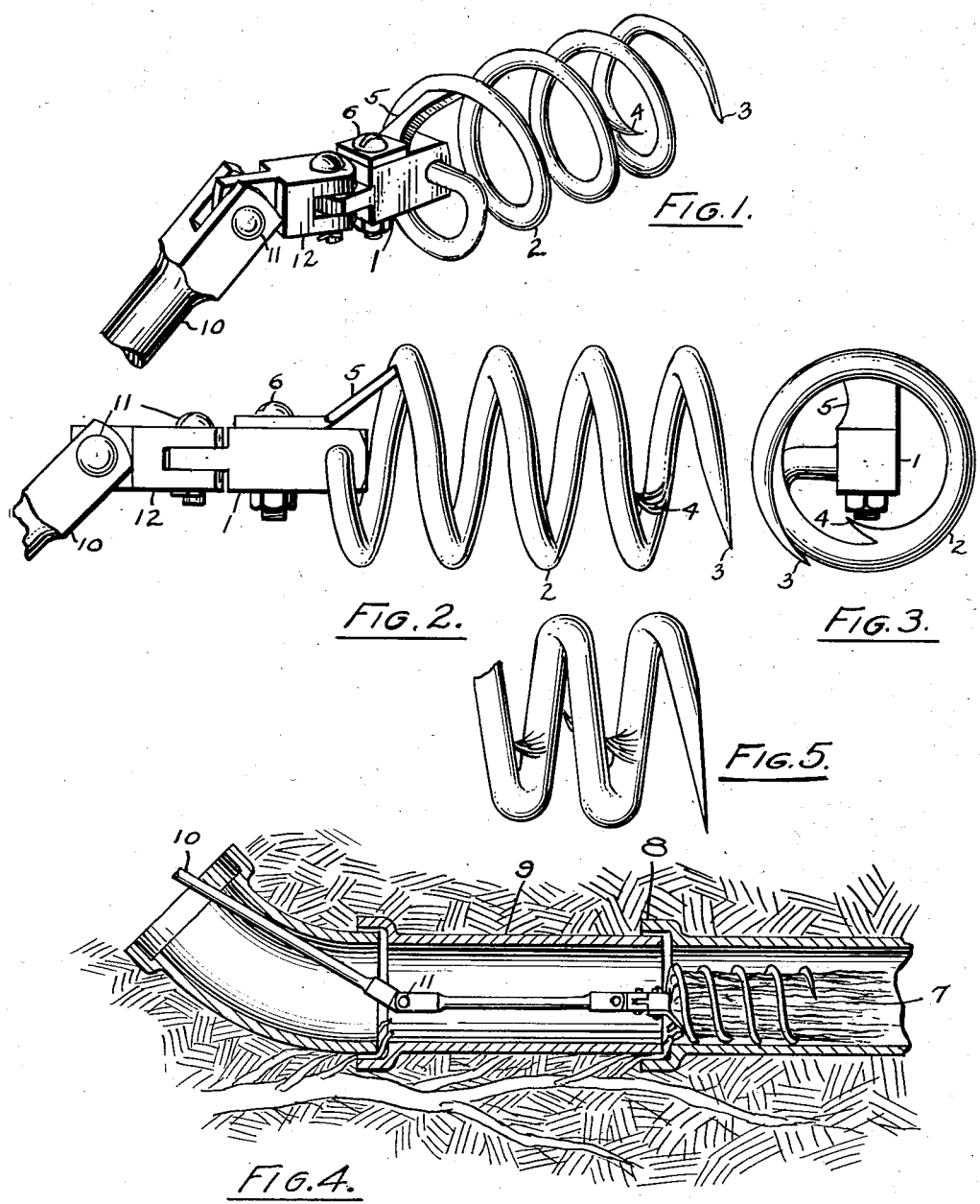

2,051,700

UNITED STATES PATENT OFFICE 2,051,700

DEVICE FOR CLEARING AND CLEANING CLOGGED PIPE LINES

Emanuel Joseph Grace, Erie, Pa.

Application September 4, 1934, Serial No. 742,645

2 Claims. (Cl. 15—104.30)

This invention relates to devices for clearing clogged pipe lines, and it has particular relation to devices for clearing sewer pipes, waste pipes, and the like.

All devices of this character made according to the prior art, and with which I am familiar, have not been successful in the removal of heavy fibrous masses such as roots of trees from sewer pipes because of the inability of the prior devices to withdraw the roots, the devices having a natural tendency to follow back through the groove which it made upon entrance into the mass. Furthermore, prior devices required such a twisting force upon entering the device into the clogging mass that operation through a bend in the pipe line was only possible in the case of a soft clogging mass. It was therefore necessary to work through short distances and in practically a straight line when the clogging mass was solid. The cost of prior devices was excessive and no means were provided for cutting roots and other fibrous material while the clearing device was passing through the clogging mass. It is, accordingly, an object of my invention, to provide a device for clearing sewer pipes and the like which is simple in construction, easy to operate, economical in cost, and efficient in operation.

Another object of my invention is to provide a pipe clearing and cleaning device which will withdraw roots and other clogging matter from the pipe line upon the withdrawal of the device from the pipe line.

Another object of my invention is to provide a pipe clearing and cleaning device which has in association therewith a cutting means for cutting roots and other fibrous matter while the device passes through the clogging mass.

Another object of my invention is to provide a pipe clearing and cleaning device which may be efficiently operated through a high angle bend in a pipe line to clear a solid obstruction therein.

The novel features that I consider characteristic of my invention are set forth in particularly in the appended claims. The invention itself, however, together with additional objects and advantages thereof, will best be understood from the following description, when read in connection with accompanying drawing, in which Fig. 1 is a perspective view of my novel pipe clearing and cleaning device.

Fig. 2 is a view in side elevation of my device.

Fig. 3 is a view in end elevation of my device.

Fig. 4 is a sectional view of an ordinary sewer pipe showing my pipe clearing device in actual operation.

Fig. 5 is a view in side elevation with parts broken away of the open helically formed rod of Fig. 1 with a plurality of spurs.

Referring to the drawing, the device comprises a shaft 1 having formed integral with one end thereof a concentrically wound helical rod 2 with the end 3 thereof pointed. The pointed end 3 of spiral rod 2 extends tangentially outwardly as shown in Fig. 3 in order that my device will follow the inner wall of the pipe line. An inwardly projecting grapple spur or barb 4 is formed integral with the outer turn of the spiral rod 2 in order to permit the cage-like head formed by the spiral rod 2 to serve as a grapple to effectively retain the dirt, roots, or other fibrous matter within it and draw it out of the pipe line when the device is removed. Although I have only shown one spur or barb 4, any number of them may be utilized by forming them on other turns of the spiral rod 2.

A cutting knife 5 is secured on the shaft 1 by a headed screw 6. The knife 5 rotates with the spiral rod 2 and cuts all roots and other fibrous material as the device passes through the clogging mass thereby tending to free the clogged portion of the pipe line and making the clearing of the obstruction much simpler. As shown in Fig. 4, the knife 5 is especially effective to cut the roots 7 at the joints 8 of the pipe line 9 where they creep into the pipe. This cutting action frees the roots 7 and other fibrous matter that has become lodged in the cage-like head formed by the spiral rod 2 and permits easy withdrawal thereof from the pipe line 9.

A plurality of jointed rods 10 are attached to each other and to the shaft 1 by pins 11. Any form of attachment may be used which will carry out the spirit of the invention. The rods 10 are comparatively short in order to efficiently operate my device through a bend in a pipe line. They are also made heavy enough that a heavy twisting force may be exerted without shearing any of the rods 10. A universal joint 12 is provided between the shaft 1 and the rods 10. Universal joints will also be provided at the bends in the pipe line and at any other point where rotation of the device might be retarded.

In operation, the rods 10 and the shaft 1 are fitted together by the insertion of the pins 11 and the device is then inserted in the pipe line and pushed along until it reaches the clogging mass. The use of jointed rods allows a much greater turning force on the device and also permits the device to operate through a high angle bend in the pipe line. When the device reaches the obstructing mass in the pipe line, it is rotated by means of the rods 10 from a remote point. The rotation of the device causes the spiral rod 2 to enter into the clogging mass with the point 3 thereof following around the inner circumference of the pipe line thereby gathering in all roots.

As the device moves inwardly, the cutting knife 5 will cut all roots or fibrous material which will tend to loosen the obstruction. This cutting action usually takes place at a pipe joint where the roots of trees enter. After the cutting action has taken place, the device is drawn backwardly and the grapple spur or barb 4 will cause the device to act as a grapple to draw out the mass of dirt, roots, and other fibrous matter. This device has been used to clear sewer pipes of solid root formations.

A device is therefore provided for clearing and cleaning pipe lines which requires a minimum amount of twisting force in order to screw the device into a clogging mass and which clears away the obstruction in a minimum amount of time and with a minimum amount of effort. Loose rags might be wound around the spiral rod 2 or more effective means could be provided with my device for thoroughly cleaning a pipe line.

Various changes may be made in the specific embodiment of the present invention without diverting from the spirit of the invention, or within the scope of the appended claims.

What I claim is:

1. A device for clearing and cleaning pipe lines comprising a shaft, means for rotating said shaft from a remote point, an open, helically wound rod substantially axially extending from one end of said shaft forming a cage-like head, an inwardly projecting grapple spur formed integral with said rod, and a cutting blade disposed on said shaft adjacent the rear portion of said helically formed rod for cutting off matter held in said helically formed rod.

2. A device for clearing and cleaning pipe lines comprising a shaft, means for rotating said shaft from a remote point, an open concentrically wound helically formed rod substantially axially extending from one end of said shaft and having a pointed end portion extending tangentially outwardly for engagement with the inner periphery of the pipe, an inwardly projecting barb formed integral with said rod, and a cutting means disposed on said shaft adjacent the rear portion of said wound rod for cutting off matter held in said open rod.

EMANUEL J. GRACE.